US007892094B2

(12) United States Patent
Tanimura et al.

(10) Patent No.: US 7,892,094 B2
(45) Date of Patent: Feb. 22, 2011

(54) GAMING MACHINE WITH A LIGHT GUIDING PLATE SUBJECTED TO A LIGHT SCATTERING PROCESS AND HAVING A LIGHT DEFLECTION PATTERN

(75) Inventors: Tatsuhiko Tanimura, Tokyo (JP); Hirofumi Sekiguchi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1306 days.

(21) Appl. No.: 10/697,084

(22) Filed: Oct. 31, 2003

(65) Prior Publication Data

US 2004/0229686 A1 Nov. 18, 2004

(30) Foreign Application Priority Data

May 14, 2003 (JP) ............................ 2003-136633

(51) Int. Cl.
*G06F 17/00* (2006.01)
*G06F 19/00* (2006.01)

(52) U.S. Cl. ............................ 463/31; 463/16; 463/20; 273/138.1; 273/142 B

(58) Field of Classification Search ..................... 463/1, 463/16-20, 30-33; 362/27; 273/138.1, 139, 273/142 R, 142 B See application file for complete search history.

(56) References Cited

U.S. PATENT DOCUMENTS 4,517,558 A * 5/1985 Davids ....................... 345/629
4,718,672 A * 1/1988 Okada ......................... 463/20
5,580,055 A * 12/1996 Hagiwara ............... 273/143 R
6,080,061 A * 6/2000 Watanabe et al. ............. 463/16
6,517,433 B2 * 2/2003 Loose et al. .................. 463/20
6,623,006 B2 * 9/2003 Weiss ...................... 273/138.2
6,638,165 B2 * 10/2003 Uchiyama et al. ............. 463/20
6,715,756 B2 * 4/2004 Inoue ..................... 273/143 R
6,790,140 B1 * 9/2004 Niwa ........................... 463/20
6,811,273 B2 * 11/2004 Satoh et al. ................... 362/27
7,097,560 B2 * 8/2006 Okada ......................... 463/20

(Continued)

FOREIGN PATENT DOCUMENTS

EP 1 260 928 A2 11/2002

(Continued)

OTHER PUBLICATIONS

EP Search Report, Dec. 29, 2004.

*Primary Examiner*—Melba Bumgarner
*Assistant Examiner*—Milap Shah
(74) *Attorney, Agent, or Firm*—Rader, Fishman & Grauer PLLC

(57) ABSTRACT

A gaming machine includes a liquid crystal display 27 having a liquid crystal panel 173 and a light guiding plate 174 placed at the rear of the liquid crystal panel 173 for guiding light emitted from illumination light means **176*a*, 176*b* for the liquid crystal panel 173 into the liquid crystal panel 173, and a variable display device placed at the rear of the liquid crystal display 27 and having a plurality of reels 3L, 3C, and 3R provided in a row each on which a plurality of symbols are arranged. Parts of the light guiding plate 174 to which the reels 3L, 3C, and 3R are opposed are cut out or are formed with recesses on the reel side and light scattering process is applied on end faces 174*a*, 174*b*, and 174*c*** of the cutouts or the recesses.

4 Claims, 6 Drawing Sheets

U.S. PATENT DOCUMENTS

| | | | | |
|---|---|---|---|---|
| 7,219,893 | B2 * | 5/2007 | Tanimura et al. | 273/143 R |
| 7,329,181 | B2 * | 2/2008 | Hoshino et al. | 463/20 |
| 2001/0031658 | A1 * | 10/2001 | Ozaki et al. | 463/16 |
| 2002/0130427 | A1 * | 9/2002 | Kobayashi et al. | 264/1.6 |
| 2002/0196388 | A1 | 12/2002 | Ohkawa | |
| 2003/0016313 | A1 | 1/2003 | Jeong | |
| 2003/0060269 | A1 * | 3/2003 | Paulsen et al. | 463/20 |
| 2003/0236118 | A1 * | 12/2003 | Okada | 463/20 |
| 2004/0014520 | A1 * | 1/2004 | Okada | 463/20 |
| 2004/0235553 | A1 * | 11/2004 | Iwamoto | 463/16 |
| 2004/0266521 | A1 * | 12/2004 | Kojima | 463/20 |
| 2005/0192090 | A1 * | 9/2005 | Muir et al. | 463/30 |

FOREIGN PATENT DOCUMENTS

| | | | |
|---|---|---|---|
| JP | 2002-143377 | A1 | 5/2002 |

* cited by examiner

GAMING MACHINE WITH A LIGHT GUIDING PLATE SUBJECTED TO A LIGHT SCATTERING PROCESS AND HAVING A LIGHT DEFLECTION PATTERN

BACKGROUND OF THE INVENTION

1. Field of the Invention

The present invention relates to a gaming machine such as a pinball slot machine (a so-called "Pachi-Slot machine" in Japan) or a pinball machine (a so-called "Pachinko machine" in Japan) including a liquid crystal display aside from a variable display device provided with a plurality of reels.

2. Description of the Related Art

For example, a pinball slot machine (a so-called "Pachi-Slot machine" in Japan) has a mechanical variable display device provided with a plurality of reels for variably displaying symbols in a front display window or an electric variable display device for displaying symbols on reels on a screen. As the player performs start operation, control means controls the variable display device for rotating the reels, thereby producing variable display of symbols. Then, the rotating reels are stopped in order automatically in a given time or as the player performs stop operation. At this time, if the symbols on the reels appearing in the display window become a specific combination (winning symbol combination), game play medium such as medals or coins are paid out to the player as the prize of the win.

In the current mainstream model, to complete a winning game for paying out medals and coins to the player as a specific symbol combination is arranged along the pay line made activated, which will be hereinafter referred to as activated line, it is required that a prize be won according to internal lottery processing (simply, internal lottery), which will be hereinafter referred to as internal winning, and that the player perform stop operation at the timing at which the symbol combination indicating completion of the winging game of the prize gaining the internal winning, which will be hereinafter referred to as internal winning combination, can be stopped on the activated line. That is, even if the internal winning is accepted, if the player cannot perform the stop operation at the good timing, the player cannot complete the winning game of the internal winning combination. That is, the gaming machines requiring that the player have a technique for performing the stop operation at the good timing (the relative importance of intervention of the technique called "observation push" is high) are mainstream at present.

A gaming machine is provided for displaying on a liquid crystal display provided aside from the mechanical variable display device, a symbol or a message required for arranging a specific symbol combination along the activated line when the variable display device stops based on the skill of the player concerning the press push so that even the player having a low skill of game play operation can play a game taking an interest in the game play.

The gaming machine in the related art includes the liquid crystal display being disposed in front of reels viewed from the front for displaying an image from the outside of the area of a reel display window to the inside of the area and superposing the image on the reel symbols for display to enhance the effect of the game aside from the mechanical variable display device for stopping and displaying symbols on reels with respect to a symbol combination responsive to the winning state of game play.

The liquid crystal display used at the time includes a light guiding plate with a light deflection pattern on the back to guide light into a liquid crystal panel. To allow light to pass through, no light deflection pattern is involved in the reel-opposed part of the light guiding plate, which will be hereinafter referred to as reel window. The player visually recognizes the symbols on each reel through the reel window. A cold-cathode tube for applying light to the light guiding plate is placed above and below the light guiding plate.

Liquid crystal panel backlights of the liquid crystal display are made up of light emission means implemented as the cold-cathode tubes and the light guiding plate with the light deflection pattern to guide light into the liquid crystal panel. The reel-opposed part of the light guiding plate (reel window) is made a transmission area with no light deflection pattern so as to enable the player to clearly see the symbols on the reel positioned at the back of the light guiding plate. Thus, the reel window involves no backlight because no light deflection pattern exists in the reel window, and a problem of dark display of the liquid crystal panel can occur. In order to solve the above problem, a fluorescent lamp is placed above and below the reel window as auxiliary light replacing cold-cathode tubes.

The configuration described above is disclosed in JP-A-2002-143377 (see paragraph [0053] and FIG. 4).

SUMMARY OF THE INVENTION

The gaming machine in the related art as described above requires the fluorescent lamps for illuminating the reel windows aside from the cold-cathode tubes for the backlights placed above and below the liquid crystal panel and thus the machine becomes complicated and the cost is also increased.

It is therefore an object of the invention to provide a gaming machine having a simple structure for preventing the light amount of a reel window from becoming insufficient.

According to the invention, there is provided a gaming machine including: a liquid crystal display 27 having a liquid crystal panel 173 and a light guiding plate 174 disposed at a rear of the liquid crystal panel 173 for guiding light emitted from illumination light means 176*a*, 176*b* for the liquid crystal panel 173 into the liquid crystal panel 173; and a variable display device disposed at the rear of the liquid crystal display 27 and having a plurality of reels 3L, 3C, and 3R provided in a row each on which a plurality of symbols are arranged (for example, see FIG. 1), wherein a part of the light guiding plate 174 to which each of the reels 3L, 3C, 3R is opposed is formed with a cutout or a recess on the side opposed to the reel 3L, 3C, 3R and light scattering process is applied on an end face 174*a*, 174*b*, 174*c* of the cutout or the recess, for example, as shown in FIGS. 3 and 4.

In the configuration, the part of the light guiding plate to which the reel is opposed is formed with the cutout or the recess on the reel side and light scattering process is applied on an end face of the cutout or the recess. Thus, light emitted from the illumination light means for the liquid crystal panel is scattered on the light scattering process applied on the end face of the cutout for illuminating the reel brightly.

According to another aspect of the invention, there is provided a gaming machine including: a liquid crystal display 27 having a liquid crystal panel 173 and a light guiding plate 174 disposed at a rear of the liquid crystal panel 173 for guiding light emitted from illumination light means 176*a*, 176*b* for the liquid crystal panel 173 into the liquid crystal panel 173; and a variable display device disposed at the rear of the liquid crystal display 27 and having a plurality of reels 3L, 3C, and 3R provided in a row each on which a plurality of symbols are arranged (for example, see FIG. 1), wherein a part of the light guiding plate 174 to which each of the reels 3L, 3C, 3R is opposed is formed with a cutout or a recess from the side opposed to the reel 3L, 3C, 3R and an end face of the cutout or the recess is formed in a shape to scatter light, for example, as shown in FIGS. 3 and 4.

In the gaming machine of the invention, a part of the reel 3L, 3C, 3R may be inserted into the cutout or the recess (for example, see FIG. 5).

In the configuration, a part of the reel 3L, 3C, 3R is inserted into the cutout or the recesses that the reels can be brought close to the player. Thus, a powerful gaming machine can be provided. Further, if the player visually observes the liquid crystal display from the slanting direction, the discrepancy between the symbols on the reels and the liquid crystal display can be lessened.

DETAILED DESCRIPTION OF THE PREFERRED EMBODIMENTS

Figure 1:
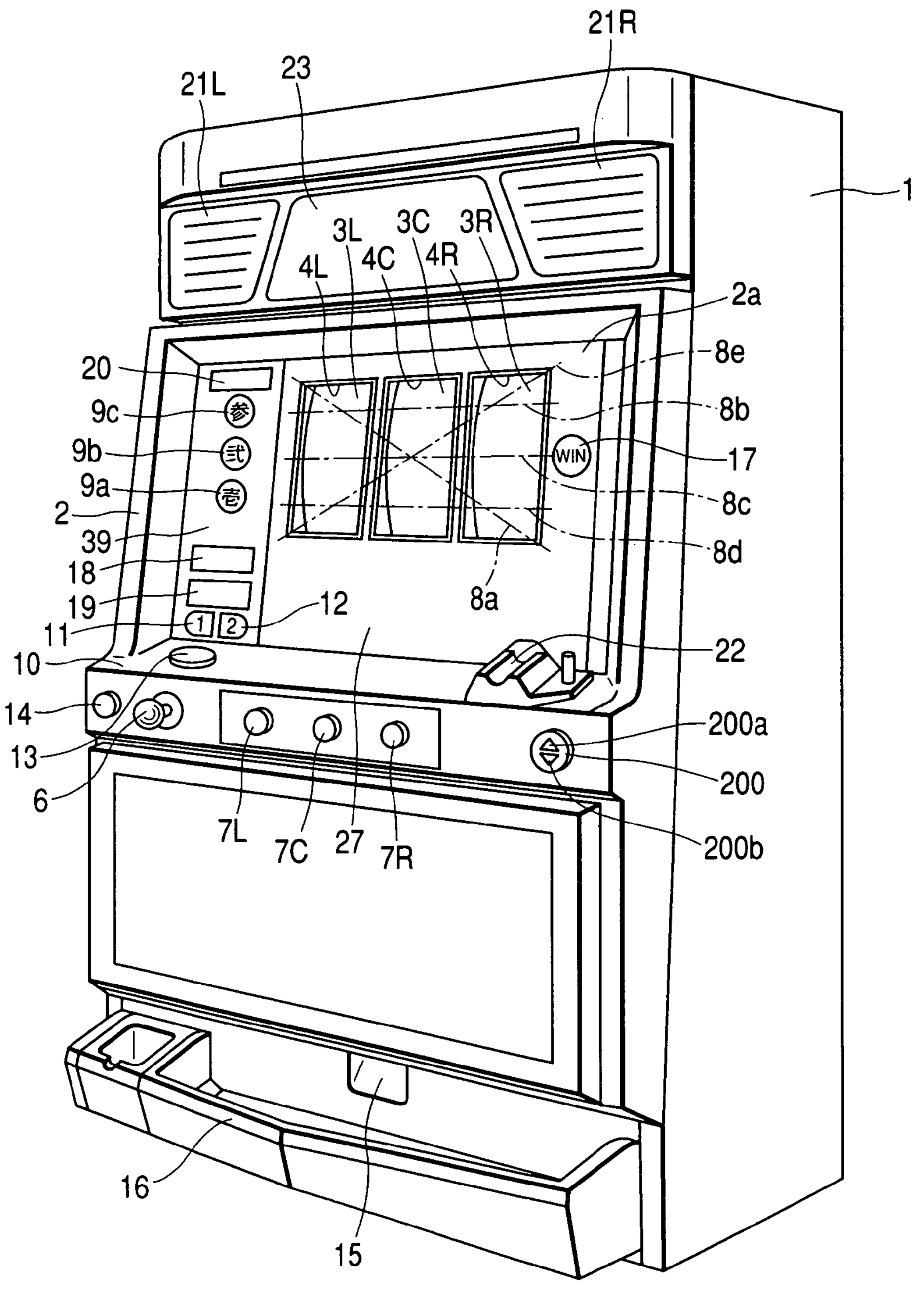
FIG. 1 is a perspective front view of a slot machine of an embodiment of the invention.

Referring now to the accompanying drawings, there is shown a preferred embodiment of the invention. FIGS. 1 through 6 show one embodiment of the invention. In the figures, members denoted by the same reference numerals represent the same or corresponding members, and a detailed description of the same parts will be omitted.

FIG. 1 is a perspective front view to show the appearance of a gaming machine 1 of an embodiment of the invention. The gaming machine 1 is a pinball slot machine (a so-called "Pachi-Slot machine" in Japan). The gaming machine 1 is provided for the player to play a game using game play medium such as a card storing information of the game play value given to the player as well as coins, medals, game play balls and tokens. In the description that follows, it is assumed that the player uses medals.

A panel display unit 2*a* is formed roughly as a vertical plane and is formed at the front of a cabinet 2 forming the whole of the gaming machine 1, and a left reel display window 4L, a center reel display window 4C, and a right reel display window 4R each shaped like a vertically oriented rectangle are provided at the center of the panel display unit 2*a*. The left reel display window 4L, the center reel display window 4C, and the right reel display window 4R are formed with a top line 8*b*, a center line 8*c*, and a bottom line 8*d* in the horizontal direction and a cross down line 8*a* and cross up line 8*e* in the slanting directions as pay lines. As the pay lines, one, three, or five lines are made activated as the player operates a 1-BET switch 11, a 2-BET switch 12, or a MAX-BET switch 13 (described later) or inserts medals into a medal insertion slot 22. Which pay lines are made activated is indicated as a BET lamp 9*a*, 9*b*, or 9*c* (described below) is lighted. The pay lines 8*a* to 8*e* are involved in whether or not a winning combination is won.

That is, if one symbol (for example, "cherry symbol 97" (described later)) corresponding to a predetermined prize (for example, small prize of cherry (described later)) is stopped and displayed at a predetermined position (for example, a position in the left display window 4L if the BET count (described later) is "3") corresponding to any pay line made activated or if the symbols making up the symbol combination corresponding to a predetermined prize are stopped and displayed in a row at a predetermined position corresponding to any pay line made activated, the winning game of the predetermined prize is complete.

In the cabinet 2*b*, three reels 3L, 3C, and 3R each with a symbol row including different types of symbols placed on the outer peripheral surface are provided in a row for rotation, making up a variable display device. The player can observe the symbols on the reels through the left reel display window 4L, the center reel display window 4C, and the right reel display window 4R. Each reel rotates at rotation speed of 80 revolutions per minute, for example, at the constant rotation time.

The 1-BET lamp 9*a*, the 2-BET lamp 9*b*, the MAX-BET lamp 9*c*, and a credit display unit 19 are provided on the left of the left reel display window 4L, the center reel display window 4C, and the right reel display window 4R. The 1-BET lamp 9*a*, the 2-BET lamp 9*b*, or the MAX-BET lamp 9*c* is lighted in response to the number of medals bet to play one game, which will be hereinafter referred to as the BET count. In the embodiment, one game is over when all reels stop. When the BET count is "1" and one pay line is made activated, the 1-BET lamp 9*a* is lighted; when the BET count is "2" and three pay lines are made activated, the 2-BET lamp 9*b* is lighted; and when the BET count is "3" and all the five pay lines are made activated, the MAX-BET lamp 9*c* is lighted. The credit display unit 19 includes seven-segment LEDs for displaying the deposited number of medals.

A notification lamp (WIN lamp 17) and a payout display unit 18 are provided on the right of the left reel display window 4L, the center reel display window 4C, and the right reel display window 4R. The notification lamp 17 basically is lighted until a winning game of BB or RB is complete after it is made possible to realize completion of the win of BB or RB. The BB and RB will be hereinafter collectively called "bonus." The payout display unit 18 includes seven-segment LEDs for displaying the number of medals paid out when a winning game is complete.

The BB and RB are as follows: The current mainstream model has different winning states. Particularly, when the winning game of a prize is complete, the player is placed in a gaming state in which the player is given a better condition than the usual state for a predetermined time period in addition to paying out a predetermined number of medals. Such prizes include a prize for allowing the player to play a predetermined number of games giving a relatively large prize to the player, and a prize for allowing the player to play a predetermined number of games giving a relatively small prize to the player. The former is referred to as big bonus (BB), and the latter is referred to as regular bonus (RB).

A bonus game information display unit 20 is provided in the upper left corner of the panel display unit 2*a*. The bonus game information display unit 20 includes seven-segment LEDs for displaying the number of games in BB ordinary gaming state (described later). A frontward projection portion 10 of a horizontal plane is formed below the left reel display window 4L, the center reel display window 4C, and the right reel display window 4R. A liquid crystal display 27 is placed between the frontward projection portion 10 and the left reel display window 4L, the center reel display window 4C, and the right reel display window 4R for displaying information concerning game play, on the roughly full face of the liquid crystal display 27.

The medal insertion slot 22 is provided on the right of the liquid crystal display 27, and the 1-BET switch 11, the 2-BET switch 12, and the MAX-BET switch 13 are provided on the left of the liquid crystal display 27. The 1-BET switch 11 enables the player to bet one of the credited medals by one push operation on a game. The 2-BET switch 12 enables the player to bet two of the credited medals by one push operation on a game. The MAX-BET switch 13 enables the player to bet as many medals as the maximum number of medals that can be bet on a game by one push operation. As the player operates any of the BET switches, the corresponding pay lines are made activated as described above.

A C/P switch 14 for the player to switch between credit and payout of the medals obtained by playing games by pushbutton operation is provided on the left of the front of the frontward projection portion 10. As the C/P switch 14 is switched, the credited medals are paid out from a medal payout opening 15 in a lower part of the front and are stored in a medal reception tray 16. On the right of the C/P switch 14, a start lever 6 for rotating the reels for starting variable display of symbols in the left reel display window 4L, the center reel display window 4C, and the right reel display window 4R as the player operates the start lever 6 is attached so that it can be turned in a predetermined angle range.

Speakers 21L and 21R are provided on the upper left and right of the cabinet 2, and a payout table panel 23 for displaying winning symbol combination, the number of payout medals, and the like is provided between the two speakers 21L and 21R. Three reel stop buttons (stop operation means) 7L, 7C, and 7R for stopping rotation of the three reels of the left reel 3L, the center reel 3C, and the right reel 3R are provided at the center of the front of the frontward projection portion 10 and below the liquid crystal display 27.

A scroll switch 200 as switching means of a menu screen displayed on the liquid crystal display 27 is provided on the right of the reel stop button 7R; the player can switch a menu by operating an upper scroll switch 200*a* and a lower scroll switch 200*b*.

Figure 2:
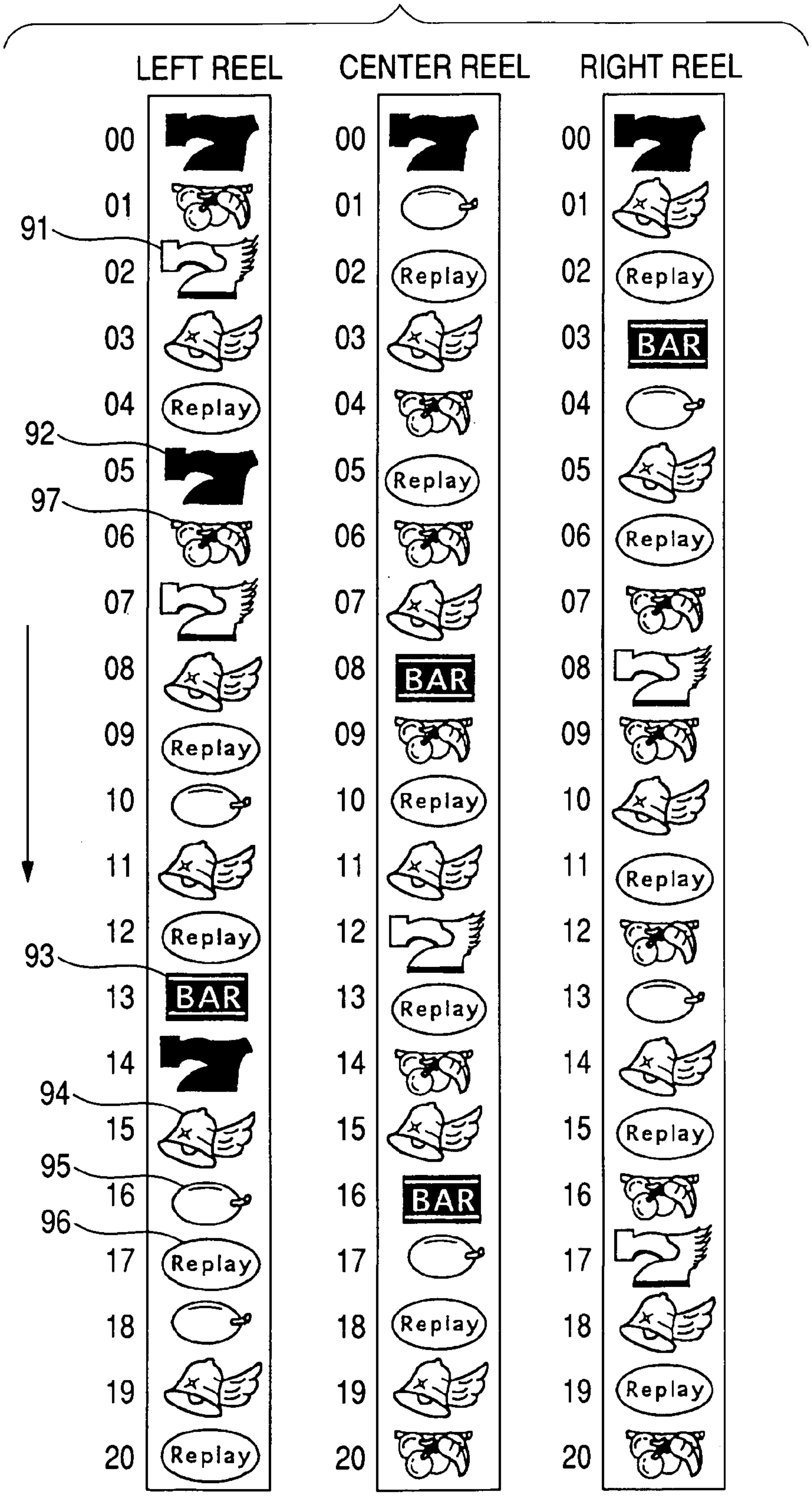
FIG. 2 is a drawing to show examples of symbols arranged on reels.

FIG. 2 shows symbol rows each made up of 21 symbols represented on each of the left reel 3L, the center reel 3C, and the right reel 3R used in the embodiment. The symbols are given code numbers 00 to 20 and are stored in ROM 32 (see FIG. 3) described later as a data table. The symbol rows each made up of symbols of "red 7 symbol 91," "blue 7 symbol 92," "BAR symbol 93," "bell symbol 94," "plum symbol 95," "Replay symbol 96," and "cherry symbol 97" are represented on the left reel 3L, the center reel 3C, and the right reel 3R. The left reel 3L, the center reel 3C, and the right reel 3R are rotated so that the symbol rows move in the lower arrow direction shown on the left in the figure.

Figure 3:
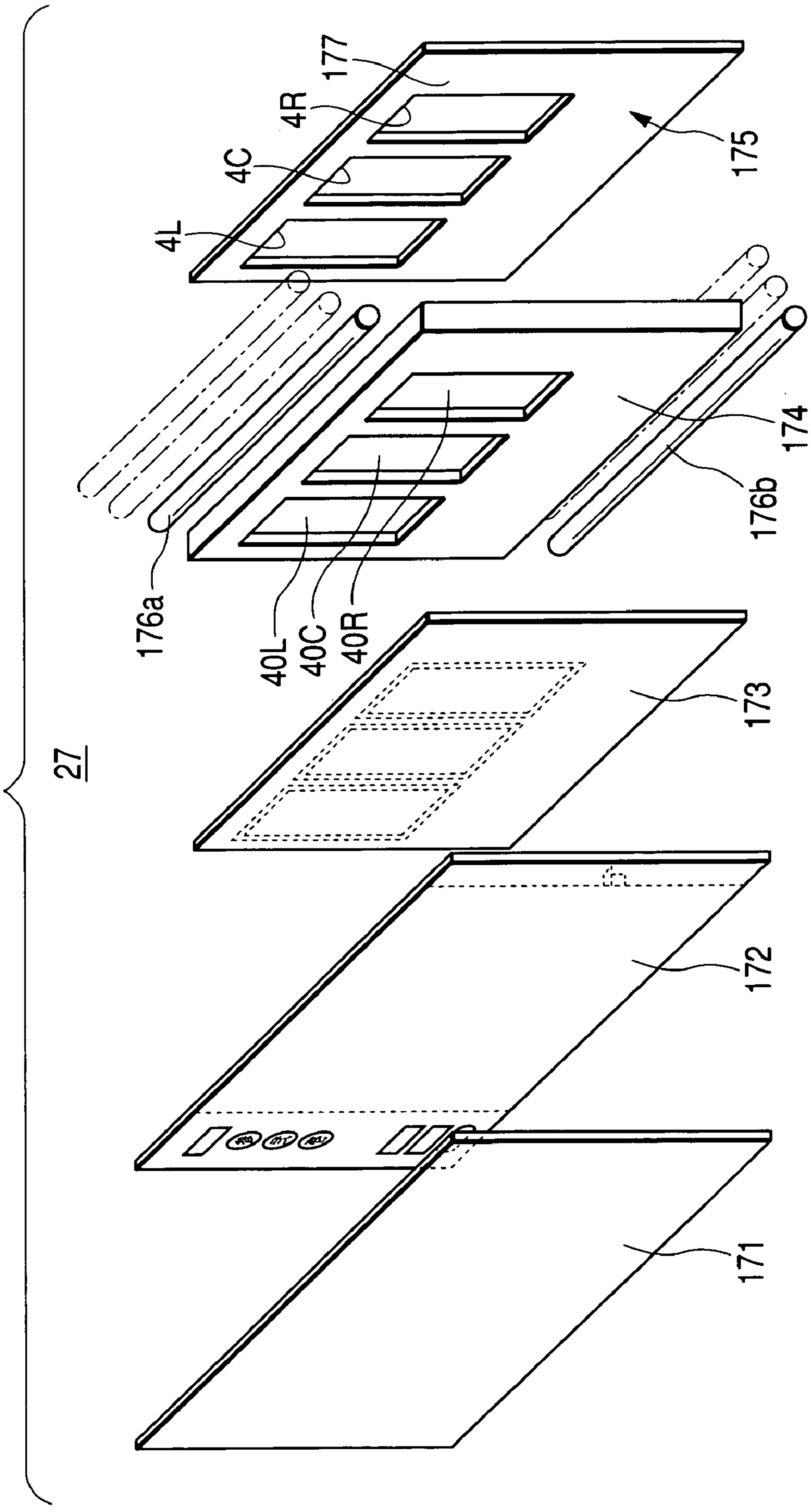
FIG. 3 is an exploded perspective view of a liquid crystal display.

FIG. 3 is an exploded perspective view to show a schematic configuration of the liquid crystal display 27. The liquid crystal display 27 includes protective glass 171 of the first layer provided on the front of the liquid crystal display 27, a display plate 172 of the second layer placed on the back of the protective glass 171, a liquid crystal panel 173 of the third layer placed on the back of the display plate 172, a light guiding plate 174 of the fourth layer placed on the back of the liquid crystal panel 173, and a reflection film 175 of the fifth layer placed on the back of the light guiding plate 174 as a five-layer panel structure. The liquid crystal display 27 further includes a flexible board (not shown) implemented as a table carrier package (TCP) on which a liquid crystal panel drive IC is mounted, connected to a terminal section of the liquid crystal panel 173, and the like. The liquid crystal display 27 is disposed on the front of the left reel 3L, the center reel 3C, and the right reel 3R with a predetermined spacing from the left reel 3L, the center reel 3C, and the right reel 3R as a separate body from the left reel 3L, the center reel 3C, and the right reel 3R.

The protective glass 171 and the display plate 172 are formed each of a translucent member. The protective glass 171 is provided for the purpose of protecting the liquid crystal panel 173 and an image is drawn in the area of the display plate 172 corresponding to the panel display unit 39 (see FIG. 1). FIG. 3 does not show various display units placed at the rear in the area of the display plate 172 corresponding to the panel display unit 2*a* or an electric circuit for operating the 1-BET lamp 9*a*, the 2-BET lamp 9*b*, and the MAX-BET lamp 9*c*.

The liquid crystal panel 173 is formed by sealing liquid crystal into the gap between a transparent substrate such as a glass plate formed with a thin-film transistor layer and a transparent substrate opposed to that substrate. The display mode of the liquid crystal panel 173 is set to "normally white". The "normally white" is a mode in which white display is produced with the liquid crystal not driven, namely, light passes through to the display face side and is visually recognized from the outside. As the liquid crystal panel 173 set to normally white is adopted, if a situation in which the liquid crystal cannot be driven occurs, the player can visually recognize the symbols placed on the left reel 3L, the center reel 3C, and the right reel 3R varying or stopped on the display through the left reel display window 4L, the center reel display window 4C, and the right reel display window 4R and can continue to play a game.

The light guiding plate 174 is disposed on the back of the liquid crystal panel 173 for guiding light applied from cold-cathode tubes 176*a* and 176*b* (cold-cathode lamps) placed on end faces into the liquid crystal panel 173 to illuminate the liquid crystal panel 173; the light guiding plate 174 is implemented as a translucent member having a light guide function, such as an acrylic-based resin, etc., having a thickness of about 2 cm, for example.

The light guiding plate 174 is formed on the back with a light deflection pattern A for guiding light from the cold-cathode tubes 176*a* and 176*b* into the liquid crystal panel 173, and the parts of the light guiding plate 174 opposed to the left reel 3L, the center reel 3C, and the right reel 3R are cut out as transmission areas. The end faces corresponding to the inside dimensions of the cutouts (reel windows 40L, 40C, and 40R) are subjected to light scattering process to form fine rough faces by blasting or with sandpaper (light scattering process faces 174*a*, 174*b*, and 174*c*), so that light is emitted as if visible light rays were scattered on the light scattering process faces 174*a*, 174*b*, and 174*c* to emit light. As each of the light scattering process faces 174*a*, 174*b*, and 174*c* crosshatched in the figure, two inner end faces (left and bottom end faces) are shown; in fact, however, each right end face and each top end face of the reel windows 40L, 40C, and 40R are also formed as similar light scattering process faces. However, one or more end faces appropriately selected from among the right end face, the left end face, the bottom end face, and the top end face may be formed as light scattering process faces.

Figure 4:
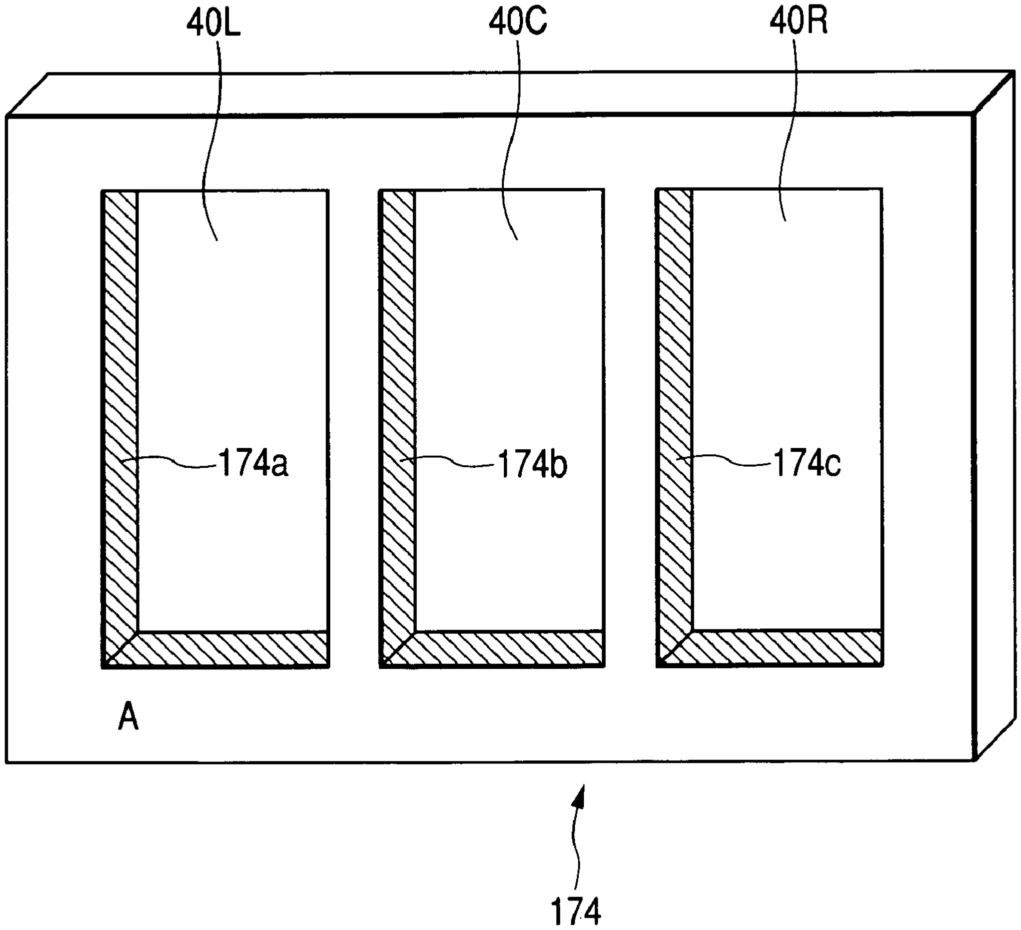
FIG. 4 is a drawing to show the detailed structure of a light guiding plate.

Here, the blasting refers to treatment of causing particles of an abrasive to collide with an end face at high speed for performing asperity treatment. Alternatively, fins may be removed. FIG. 4 is a drawing when the light guiding plate is viewed from the inside of the gaming machine (the side of the left reel 3L, the center reel 3C, the right reel 3R).

Thus, the light scattering process faces 174*a*, 174*b*, and 174*c* provided by blasting act as backlights of the reel windows 40L, 40C, and 40R where it is hard to form a light deflection pattern by molding, improving color development of the liquid crystal panel 173 and making it possible to eliminate light emission unevenness of RGB-LED of reel backlight. Further, the light scattering process faces 174*a*, 174*b*, and 174*c* also illuminate the left reel 3L, the center reel 3C, and the right reel 3R, and the symbols on the left reel 3L, the center reel 3C, and the right reel 3R are represented sharply. Since auxiliary light is not required, the structure becomes simple accordingly and the cost can be reduced.

Further, production of noise by a drive circuit (such including inverter) of auxiliary light is eliminated.

According to the described embodiment, blasting is applied on the end faces of the cutouts of the light guiding plate 174 to emit light from the end faces. However, to manufacture the light guiding plate 174 by injection molding, for example, a light deflecting pattern can be formed without blasting. For example, fine working of cone cut is applied on a mold and a light deflection pattern as a light scattering shape is transferred to the surface of the light guiding plate 174 by injection molding. A fine V-letter shaped groove is transferred to the light emission face side of the molded article.

Thus, the light scattering process faces 174*a*, 174*b*, and 174*c* as the end faces to which the scatter patterns for scattering light are transferred act as the backlights of the reel windows 40L, 40C, and 40R, as described above.

Figure 5:
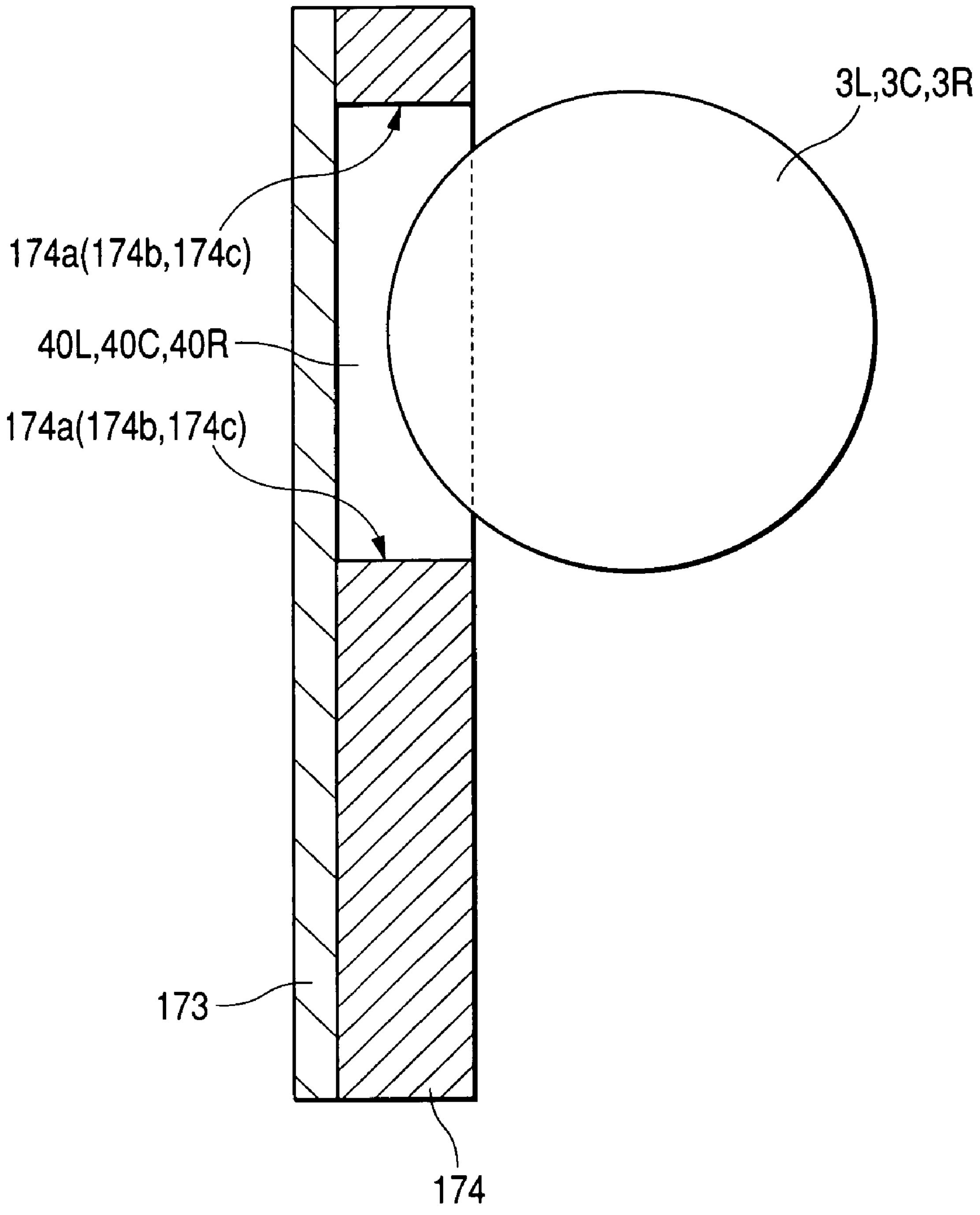
FIG. 5 is a sectional view to show placement of the light guiding plate and a reel.

FIG. 5 is a sectional view to describe the positional relationships among the liquid crystal panel 173, the light guiding plate 174, and the left reel 3L, the center reel 3C, and the right reel 3R. The liquid crystal panel 173, the light guiding plate 174, and the reels (left reel 3L, center reel 3C, and right reel 3R) are placed in order from the side of the player, namely, the left in the figure. If a part of each reel on the side of the liquid crystal panel is placed without being inserted into the reel window 40L, 40C, 40R, the player is given the impression that the left reel 3L, the center reel 3C, and the right reel 3R are at depth as much as the thickness of the light guiding plate 174 relative to the liquid crystal panel 173. When the liquid crystal display 27 produces effect display of superposing the pay line display, the symbols on the reels, and liquid crystal display, if the player visually observes the liquid crystal display 27 from the slanting direction, parallax discrepancy may occur between the symbols on the reels and liquid crystal display.

However, according to the embodiment, as shown in FIG. 5, a part of the left reel 3L, the center reel 3C, the right reel 3R on the side of the liquid crystal panel is inserted into the reel window 40L, 40C, 40R for placement. Thus, the impression that the reels are at depth can be eradicated and in addition, if the player visually observes the liquid crystal display 27 from the slanting direction, the discrepancy between the symbols on the reels and the liquid crystal display 27 can be lessened.

When upsizing the liquid crystal panel 173, for example, to increase the screen area from 15 inches to 20 inches, it is necessary to provide a plurality of cold-cathode tubes 176*a* and 176*b* of light emission means (for example, increase the number of the cold-cathode tubes from one to three) in the depth direction to maintain the light amount per means area. Accordingly, the light guiding plate 174 needs to be thickened as the number of the cold-cathode tubes is increased. In the case above, if a part of each reel on the side of the liquid crystal panel is placed without being inserted into the reel window 40L, 40C, 40R, the impression that the reels are at depth and the discrepancy between the symbols on the reels and the liquid crystal display 27 described above still more grow. Thus, the advantage of inserting a part of each reel on the side of the liquid crystal panel into the reel window 40L, 40C, 40R for placement in the embodiment is still more increased.

In the embodiment, specific portions of the light guiding plate 174 are cut out as the transmission areas. However, the light guiding plate 174 may be formed with recesses cut or formed from the side of the left reel 3L, the center reel 3C, the right reel 3R into which a part of the left reel 3L, the center reel 3C, the right reel 3R is inserted.

Referring again to FIG. 3, the cold-cathode tube 176*a*, 176*b* (if the screen size is large, a plurality of cold-cathode tubes are provided in the depth direction) is implemented as a white light source containing light of all wavelengths in a percentage in which a specific color is not conspicuous for eyes of a human being. The cold-cathode tube 176*a* is disposed along the upper end portion of the light guiding plate 174 (placed upright in the vertical direction) in the figure; the cold-cathode tube 176*b* is disposed along the lower end portion of the light guiding plate 174 in the figure. The cold-cathode tube 176*a*, 176*b* is supported at both ends by a lamp holder (not shown). The cold-cathode tube 176*a*, 176*b* functions as illumination light means for the area corresponding to the effect display area mainly in the area of the liquid crystal panel 173. That is, the cold-cathode tube 176*a*, 176*b* generates light to be introduced into the light guiding plate 174.

The reflection film 175 is provided by executing sputter deposition of a silver evaporated film on a white polyester film or aluminum thin film, for example, and is used to reflect the light introduced into the light guiding plate 174 toward the front of the light guiding plate 174, namely, in the direction of the liquid crystal panel 173. The reflection film 175 is formed with a reflection area 177 and the left reel display window 4L, the center reel display window 4C, and the right reel display window 4R as non-reflection areas.

The left reel display window 4L, the center reel display window 4C, and the right reel display window 4R correspond to the left reel 3L, the center reel 3C, and the right reel 3R respectively. Each reel display window is formed as a light transmission display part for allowing incident light to pass through, and is positioned in front of the symbols displayed when rotation of the left reel 3L, the center reel 3C, the right reel 3R stops, and has a size capable of displaying a total of three symbols at upper, center, and lower stages at the stop display time. The reflection area 177 reflects incident light and functions as one of the illumination light means for the area corresponding to the effect display area mainly in the area of the liquid crystal panel 173. The configuration enables the player to visually recognize variable display device and stop display of the left reel 3L, the center reel 3C, and the right reel 3R through the light transmission display parts of the reflection means and thus makes it possible for the player to enjoy playing a game according to the display mode of the left reel 3L, the center reel 3C, and the right reel 3R and the liquid crystal display 27.

Figure 6:
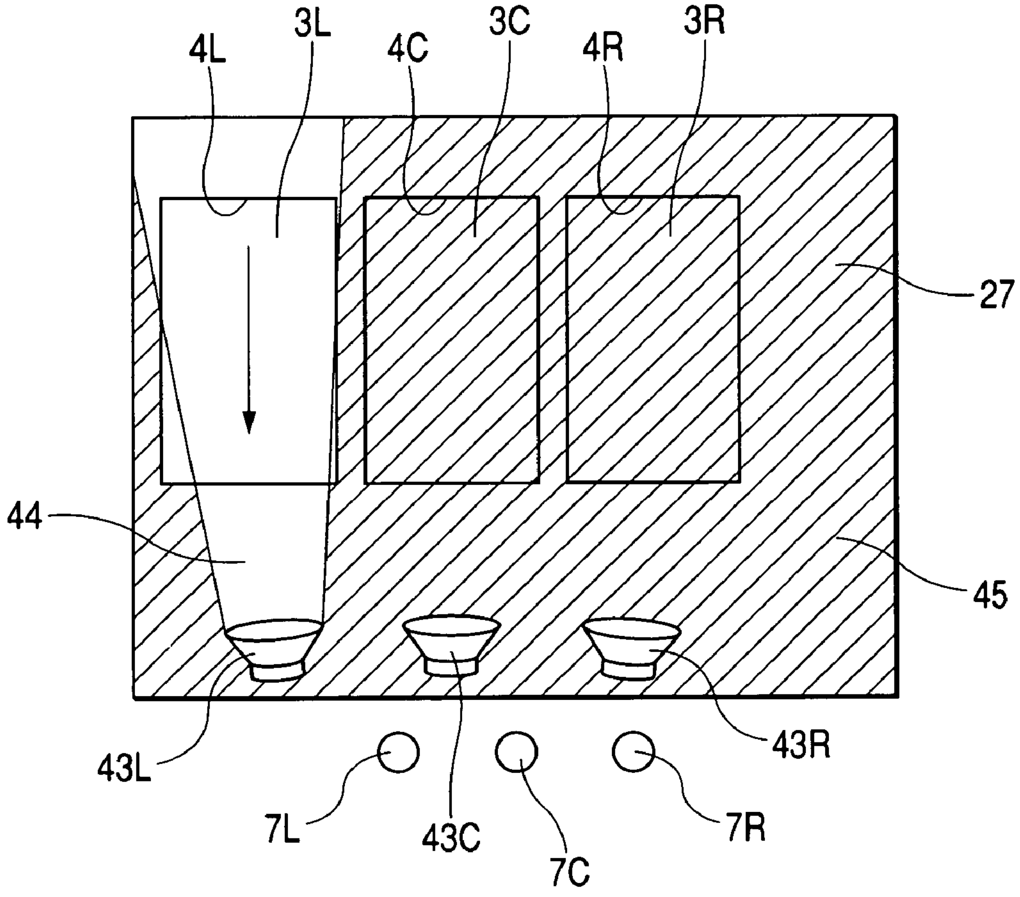
FIG. 6 is a schematic drawing to show the effect of the slot machine of the embodiment of the invention.

FIG. 6 is a schematic drawing to show the effect mode of the gaming machine of the embodiment of the invention. It shows the display mode of stop notification for notifying the player of the stop order of the reels. The liquid crystal display 27 of the gaming machine can be made up of the protective glass, the display plate, the liquid crystal panel, the light guiding plate, and the reflection film in order from the front to the back as the panel structure as described above.

As shown in FIG. 6, animated light sources 43L, 43C, and 43R are placed in order from left to right in the figure at the bottom of the liquid crystal display 27. From the animated light source 43L, a searchlight image 44 as a light transmission display part is disposed as an image for illuminating the left reel 3L disposed above the animated light source 43L. The searchlight image 44 is an image from the outside of the area of the left reel display window 4L of the left reel 3L, the center reel display window 4C, and the right reel display window 4R to the inside of the area. The searchlight image 44 is superposed on the reel symbols through the display of the portion which includes at least a part of the searchlight image 44 in the display area (FIG. 6). Whereby, the symbols on the left reel 3L are displayed through the searchlight image 44. Accordingly, the player is notified of the reel stop order and is prompted to operate the button.

In FIG. 6, a non-transmission display area 45 of image area of the liquid crystal display 27 except for the searchlight image 44 and the display areas of the reel display windows of the center reel 3C and the right reel 3R are superposed on each other, whereby the player can be prevented from visually recognizing the center reel 3C and the right reel 3R which are producing variable display device.

At this time, the player can see the left reel 3L through the superposition of the searchlight image 44 and the display window 4L.

In the embodiment, the reel can be seen through the superposition of the searchlight image 44 and each display window 4L, 4C, 4R as if the reel were illuminated by the searchlight. At this time, the reel is illuminated brightly because of light scattering process applied on the end faces of the cutout if fluorescent lamps for illuminating the reel window do not exist aside from the cold-cathode tubes for the backlights placed above and below the liquid crystal panel.

The gaming machine of the embodiment includes the mechanical variable display device for stopping and displaying symbols on reels with respect to a symbol combination responsive to the winning state of game play and the liquid crystal display wherein the parts of the light guiding plate opposed to the reels, the light guiding plate being formed with light deflection patterns for guiding light from the light emission body into the liquid crystal panel, are cut out or are formed with recesses and light scattering process is applied on the end faces of the cutouts or the recesses. Thus, it becomes unnecessary to provide fluorescent lamps above and below the reel windows and the gaming machine for preventing the liquid crystal display and the reels from becoming dark because the light amount of each reel window is insufficient can be provided.

The gaming machine of the embodiment includes the mechanical variable display device for stopping and displaying symbols on reels with respect to a symbol combination responsive to the winning state of game play and the liquid crystal display wherein the parts of the light guiding plate opposed to the reels, the light guiding plate being formed with light deflection patterns for guiding light from the light emission body into the liquid crystal panel, are cut out or are formed with recesses and a scatter pattern is transferred to the end faces of the cutouts or the recesses. Thus, it is not necessary to provide fluorescent lamps above and below the reel windows or a small fluorescent lamp needs only to be provided.

Further, in the gaming machine of the embodiment, a part of each reel on the side of the liquid crystal panel is inserted into the cutout or the recess. Thus, front space for bringing the reels close to the player can be formed for shortening the distance between the reels and the player, so that the powerful gaming machine can be provided.

Further, if the player visually observes the liquid crystal display 27 from the slanting direction, the discrepancy between the symbols on the reels and the liquid crystal display 27 can be lessened.

As for the functions and the advantages described in the embodiment of the invention, the preferred functions and advantages produced from the invention are only enumerated and the functions and the advantages of the invention are not limited to those described in the embodiment of the invention.

As described above, according to the invention, it is made possible to provide the gaming machine capable of preventing the light amount of each reel window from becoming insufficient as the light emitted from the light illumination means for the liquid crystal panel is scattered on the end faces of the cutouts where the light scattering process is applied or is formed in a shape to scatter light.

Although only some exemplary embodiments of the invention have been described in detail above, those skilled in the art will readily appreciate that many modifications are possible in the exemplary embodiments without materially departing from the novel teachings and advantages of the invention. Accordingly, all such modifications are intended to be included within the scope of the invention.

What is claimed is:

1. A gaming machine comprising:

an illumination unit that emits light;

a liquid crystal display device that includes a liquid crystal panel, and a light guiding plate disposed at a rear of the liquid crystal panel for guiding light emitted from the illumination unit to the liquid crystal panel;

a variable display device that is disposed at a rear of the liquid crystal display device and includes a plurality of reels provided in a row each on which a plurality of symbols are arranged; and a reflection film provided between the light guiding plate and the plurality of reels, wherein a part of the light guiding plate to which each of the reels is opposed is formed with a cutout or a recess on the side opposed to the reel, wherein an end face of the cutout or the recess corresponding to the inside dimensions of the cutout or the recess is configured for and subjected to a light scattering process, wherein the light guiding plate illuminates the reels with light scattered out from the cutout or the recess, wherein the light guiding plate has a back surface side and a front surface side and has a light deflection pattern formed on the back surface side for guiding light emitted from the illumination unit towards the liquid crystal panel, and wherein the reflection film reflects the light emitted from the light guiding plate towards the front surface side.

2. The gaming machine as claimed in claim 1, wherein a part of at least one of the plurality of reels is inserted into the cutout or the recess.

3. The gaming machine according to claim 2 further comprising a processor that is operable with the liquid crystal display device to:

perform an internal lottery of a game with a random number at a predetermined timing;

stop at least one of the symbols of the variable display device based on the result of the internal lottery carried out by the internal lottery means; and pay out a game medium to a player in a case where a stop state of the variable display device corresponds to a predetermined stop state.

4. The gaming machine according to claim 3 further comprising an operation unit that allows the player to input operation for stopping at least one of the symbols of the variable display device, wherein the processor stops the symbols based on the internal lottery and on the operation input through the operation unit.

* * * * *